Feb. 16, 1965  W. ROTH  3,170,094
LIQUID LEVEL INDICATOR
Filed May 29, 1961
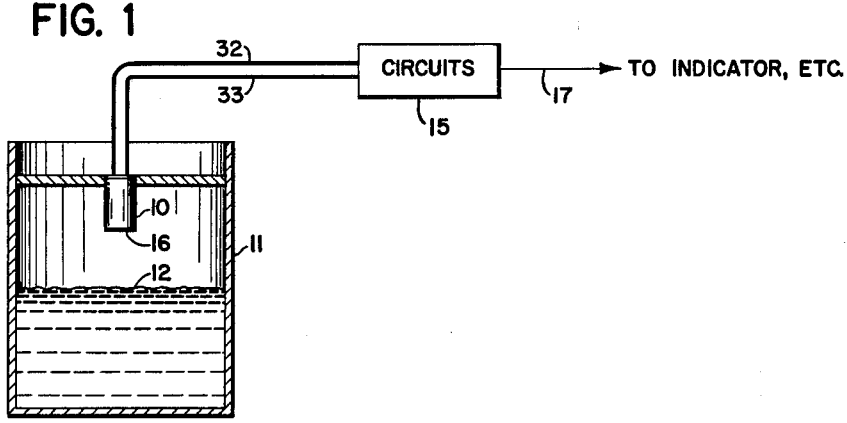
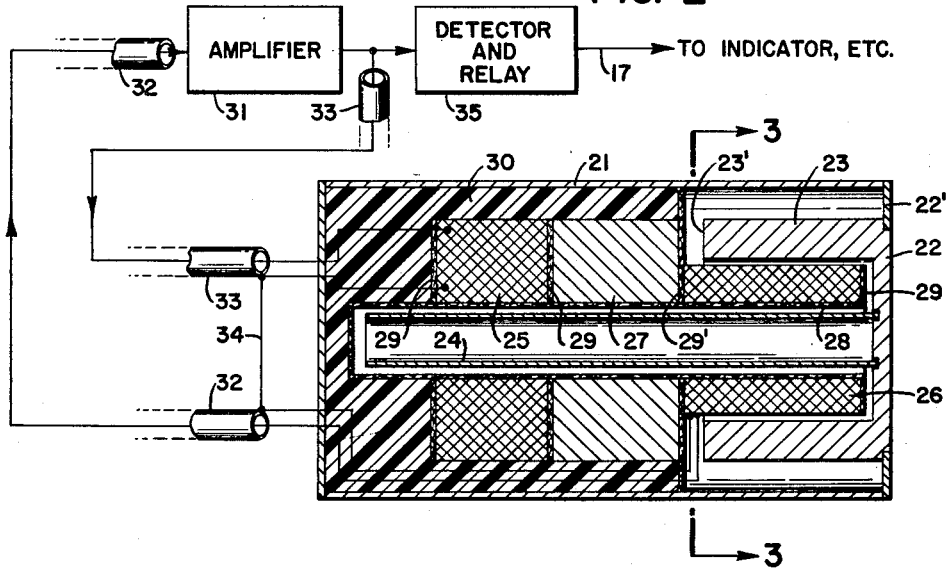
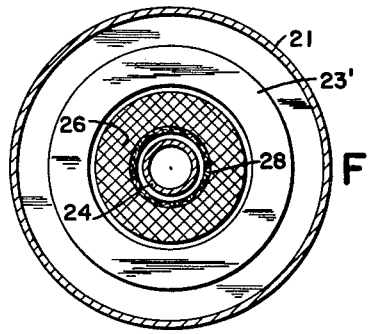
INVENTOR
WILFRED ROTH
BY
ATTORNEYS United States Patent Office 3,170,094
Patented Feb. 16, 1965

3,170,094
LIQUID LEVEL INDICATOR
Wilfred Roth, 58 Brainard Road, West Hartford, Conn.
Filed May 29, 1961, Ser. No. 113,320
4 Claims. (Cl. 317—146)

This invention relates to a liquid level indicator.

For many uses, liquid level indicators should be capable of withstanding highly adverse environments. Thus temperature extremes may be encountered, and mechanical ruggedness is frequently important. In many cases the indicator may be required to operate for considerable periods of time without attention, or a failure may be serious. Accordingly, reliability is important, and especially reliable operation over a wide range of environmental conditions. In addition, simplicity and low cost are desirable.

The present invention is designed to provide a liquid level indicator which is reliable, rugged and comparatively inexpensive, and provides a large factor of safety for changes in operating conditions as well as for avoiding excessive manufacturing tolerances.

In accordance with the invention, a transducer is employed having a mechanically oscillatory element arranged to be contacted by a liquid whose level is to be sensed, and be damped thereby. Transmitting means is provided in the transducer for producing mechanical oscillation of the element in response to an electric wave, and also receiving means for producing an output electric wave in response to the mechanical oscillation. Means are provided for substantially eliminating coupling between the transmitting and receiving means except through the mechanically oscillating element.

An amplifier is employed having its input connected to the receiving means and its output connected to the transmitting means in regenerative relationship to form a regenerative loop including the mechanically oscillating element. With the transducer in air or other gaseous medium, the mechanical element is relatively free to oscillate. However, when contacted by a liquid its motion is strongly damped. The amplifier gain is selected to lie between the gains required to produce mechanical oscillation of the element when in contact with and out of contact with the liquid. Means are then provided responsive to the presence or absence of oscillations in the regenerative loop.

Advantageously operation is in the ultrasonic frequency range, thereby permitting the transducer to be made physically small as well as yielding other operational advantages.

With this arrangement the transducer may be made the principal factor determining the frequency of oscillation, so that variations in temperature, pressure, etc. affecting the transducer resonant frequency are automatically dealt with. Further, with the transmitting and receiving means in the transducer coupled substantially only by the mechanically oscillatory element, there is a large difference between the gains required to produce oscillation when in and out of contact with the liquid. Therefore considerable variations in the parameters of the transducer and amplifier are possible without false operation. This promotes satisfactory operation under widely varying operating conditions. Also, this factor together with the overall simplicity of the apparatus promotes economical manufacture.

In a preferred embodiment a transducer is employed having a diaphragm and an elongated magnetostrictive element attached thereto. Separate transmitting and receiving coils encircle the magnetostrictive element for producing and responding to movement thereof. Means are provided for substantially eliminating electromagnetic coupling between the coils. Such a transducer can be made very rugged and capable of withstanding large temperature variations.

This invention will be described in connection with a specific embodiment thereof illustrated in the drawings, in which:

FIG. 1 illustrates the transducer in position to sense the level of a liquid in a container;

FIG. 2 is a detailed view of the transducer in longitudinal cross-section, with associated circuit components; and FIG. 3 is a cross-section along the line 3—3 of FIG. 2.

Referring to FIG. 1, transducer 10 is shown mounted in a container 11 in which the level of a liquid 12 is to be sensed. The transmitting and receiving elements in transducer 10 are connected by leads 32 and 33 to a unit 15 containing an amplifier and other circuits for producing a response when the liquid 12 rises to the level of the face 16 of the transducer. This response is supplied through lead 17 to a suitable indicator such as an alarm or red light, or to a control circuit, etc.

Referring to FIG. 2, the transducer is shown as having a casing 21 with a diaphragm 22 mounted in the front end thereof by a thin annular member 22'. The periphery of the diaphragm 22 is integral with a tubular member 23 whose length and diameter are selected to substantially prevent movement of the periphery of the diaphragm in the axial direction, as described in my copending application Serial No. 863,007, filed December 30, 1959, for "Transducers," now Patent No. 3,070,790. Briefly, with the rear end 23' free to move as shown, the length of 23 may be at or near a quarter-wavelength of waves propagating longitudinally thereof at the operating frequency, and the diameter and wall thickness are selected to support a ring mode of oscillation at substantially twice the operating frequency.

As explained in the aforesaid application, this construction effectively clamps the diaphragm periphery against axial movement, and the manner of mounting the casing 21 in a housing has little effect on the transducer operation. However, if desired, other means for clamping the diaphragm periphery may be employed.

A tube 24 of magnetostrictive material has one end free and the other attached to the central portion of diaphragm 22. A pair of coils 25 and 26 encircle tube 24. One serves as a transmitting coil to produce elongation and contraction of the nearby portions of the tube in response to an A.-C. electric current supplied thereto. This sets up elastic wave oscillations propagating longitudinally of tube 24, and thereby causes oscillation of diaphragm 22. The other serves as a receiving coil responsive to elastic wave oscillations in tube 24, and hence of diaphragm 22, to produce a corresponding electrical output. In the embodiment coil 26 is the receiving coil. Permanent magnet 27 provides a magnetic bias to establish an operating point such that positive and negative half-cycles of the applied current in coil 25 produce opposite forces on the tube 24 and causes the diaphragm 22 to oscillate at the fundamental frequency of the A.-C. wave in coil 25. The bias also enables elastic wave oscillations in tube 24 to develop a voltage in coil 26, and this will have the same fundamental frequency.

The aforesaid application describes the dimensioning and functioning of the magnetostrictive tube, diaphragm and clamping member in greater detail, and reference is made thereto for further information if required.

In order to substantially eliminate electromagnetic coupling between coils 25 and 26, the magnet 27 is placed therebetween and coil 26 is positioned inside the clamping member 23. Since magnet 27 has a substantial permeability, it acts as a magnetic shield between coils 25 and 26. Clamping member 23 may be of steel, brass or other metal depending on the application. If of steel, the magnetic permeability assists in shielding the coils from each other. If of brass or other non-magnetic metal, the conductivity provides a useful degree of shielding for time-varying magnetic fields. Leads to the coils are arranged to avoid substantial coupling therebetween, ways of so doing being well known to those skilled in the art.

The coils may be wound or mounted on a tube 28 preferably of insulating material, and disks 29, 29' of similar material provided at the coil ends. This permits the convenient insertion of the coil and magnet structure. Potting compound 30 may then be introduced to seal the structure in place, disk 29' serving as a stop for the potting compound.

The receiving coil 26 is connected to the input of amplifier 31 and the transmitting coil 25 is connected to the output of the amplifier. Advantageously shielded cables are employed, as shown at 32 and 33, so as to avoid external coupling between the output and input of the amplifier. In many installations a considerable length of cable may be required between transducer and amplifier. Cable is available which is essentially two shielded coaxial cables in a single jacket and may be convenient for the purpose. As shown, the outer conductors of cables 32, 33 are connected by conductor 34, and in practice may be grounded. Couplings may be provided on casing 21 for attaching the cables, but are not shown since they are well known in the art. If desired cables 32, 33 may have twisted pairs of conductors in respective shields, thereby avoiding the necessity of a common ground for one conductor of each pair and allowing more freedom in amplifier design.

Coils 25, 26 and amplifier 31 are connected in regenerative relationship. That is, the connections of the coils to the amplifier are selected so that an output to coil 25, coupled to coil 26 through the elastic waves in magneto strictive tube 24, gives an input to the amplifier which reinforces the initial output. Consequently, with sufficient gain in the amplifier, continuous oscillations of diaphragm 22 may be produced.

The gain required to produce continuous oscillations with the diaphragm in air or other gaseous medium is much smaller than the gain required when the diaphragm is damped by contact with a liquid. In one embodiment a ratio of 1:30 was found between air and water. Higher ratios may be obtained by care in design. Liquids other than water may have a somewhat different damping effect on the diaphragm, but in general the gain required for continuous oscillation will be many times that required for air. Accordingly, by selecting an amplifier gain at an appropriate point between these two limits, regenerative oscillations will exist when the diaphragm is out of contact with the liquid, but not when it is in contact.

For many applications a gain equal to the mean of the two limiting values is a suitable choice, since it allows a wide margin of safety for changes in gain in either direction. For example, if a gain of 7.6 is required in air and a gain of $30 \times 7.6 = 228$ when the transducer is in contact with water, as was true in one particular embodiment, an amplifier with a gain of $$\sqrt{7.6 \times 228} = 41$$

is a suitable choice. This gives a factor of safety of 5.5 to 1 for change of gain in either direction.

Such change of gain may result from changes in operating conditions, particularly changes in temperature. Where the departure from normal or design center conditions is expected to be greater in one direction than the other, the gain of the amplifier may be on the side of the mean value which provides a greater factor of safety for departures in that direction.

With the transducer structure shown in FIG. 2, the mechanical oscillating portion has a high Q (high ratio of mechanical reactance to loss), and consequently a narrow bandwidth. For example a bandwidth at resonance in the neighborhood of 260 cycles per second at an operating frequency around 37 kilocycles per second has been noted. This narrow bandwidth is desirable since it promotes operating efficiency and reduces the possibility of extraneous noise, etc. affecting operation. Also the low inherent loss renders the liquid damping more effective, that is there is a greater ratio in amplitude of diaphragm oscillation between undamped and damped conditions.

Advantageously, the bandwidth of amplifier 31 is considerably greater than that of the transducer, so that the resonant frequency of the transducer is the principal factor determining frequency of operation. Consequently, changes in the transducer resonant frequency due to temperature or other effects change the frequency of the regenerative oscillation without affecting proper operation.

Losses in the regenerative loop may also change, particularly at temperature extremes, but the large factor of safety insures continuation of operation.

In use the diaphragm may become coated, or droplets may adhere thereto, etc. If this causes a change in the effective mass or stiffness of the diaphragm some shift in operating frequency may occur, but as above pointed out proper operation will continue. The coating may introduce some losses, as with a viscous coating, and in this case the larger factor of safety for change of gain is important in maintaining proper operation.

Even though the amplifier bandwidth is considerably greater than that of the transducer, a tuned amplifier may still be employed since the bandwidth of electrical tuning circuits is commonly much greater than that of the transducer, or can readily be made so. Such tuning increases the stage gain so a simple amplifier suffices. The gain of the amplifier may be affected by temperature. However, the amplifier may be located at a distance from the transducer, and in many situations may not be subject to as wide a temperature variation. Also with proper design and selection of components, variations in amplifier gain may be kept well within the required limits.

The presence or absence or regenerative oscillations in the loop may be determined in any desired manner. Conveniently, it may be accomplished by supplying the output of the amplifier 31 to a detector in unit 35, and the detected signal employed to actuate a relay. The relay may then be employed to give a signal, operate control apparatus, etc.

As above described, the coils 25 and 26 are electromagnetically shielded, and care is taken to eliminate any other coupling between the output and input of the amplifier except through the mechanically oscillating magnetostrictive tube 24. Such extraneous coupling reduces the factor of safety in operation. In general it is desirable to reduce the extraneous coupling well below the coupling between the two coils provided by the magnetostrictive tube when the diaphragm is in contact with a liquid.

A magnetostrictive transducer such as described is particularly suitable for the present invention since it is simple, reliable and economical to manufacture, and the materials of which it is made can be selected to withstand great temperature extremes. Although the shielding means shown is simple and effective, it may be changed if desired, and additional shielding may be employed if the application requires.

I claim:

1. Liquid level sensing apparatus which comprises a magnetostrictive transducer having a diaphragm and an elongated magnetostrictive element attached thereto for producing oscillation thereof, said diaphragm being externally positioned for contact by a liquid whose level is to be sensed and be damped thereby, said diaphragm and the structure attached thereto forming a mechanically resonant structure, separate transmitting and receiving coils encircling said magnetostrictive element in spaced relationship therealong for producing and responding to oscillations therein, respectively, a magnet encircling the magnetostrictive element for producing a substantial magnetic bias therein, an amplifier having an input connected to the receiving coil and an output connected to the transmitting coil in regenerative relationship to form a regenerative loop including said magnetostrictive element in which the regenerative frequency of oscillation is essentially determined by the mechanical resonant frequency of said mechanically resonant structure, the gain of the amplifier being predetermined to lie between the gains required to produce oscillation of said diaphragm when in contact with and out of contact with the liquid, shielding means in said transducer for reducing the electromagnetic coupling between said coils to a value substantially less than the coupling therebetween through the magnetostrictive element when the diaphragm is in contact with said liquid, means for determining the presence or absence of oscillations in said regenerative loop.

2. Liquid level sensing apparatus which comprises an ultrasonic transducer including a diaphragm mounted at one end thereof for contact with a liquid whose level is to be sensed, an elongated magnetostrictive element attached at one end to the diaphragm for producing oscillation thereof, said diaphragm and the structure attached thereto forming a mechanically resonant structure, separate transmitting and receiving coils encircling the magnetostrictive element in spaced relationship therealong, a magnet encircling the magnetostrictive element for producing a substantial magnetic bias therein, said magnet being positioned between said coils to provide electromagnetic shielding therebetween, a cylindrical member of electromagnetic shielding material encircling the magnetostrictive element in spaced relationship and attached at one end to the periphery of the diaphragm, said cylindrical member extending at least partially along the coil nearer the diaphragm to provide electromagnetic shielding between the coils, an amplifier having an input connected to the receiving coil and an output connected to the transmitting coil in regenerative relationship to form a regenerative loop including said magnetostrictive element in which the regenerative frequency of oscillation is essentially determined by the mechanical resonant frequency of said mechanically resonant structure, the gain of the amplifier being predetermined to lie between the gains required to produce oscillation of said diaphragm when in contact with and out of contact with the liquid, said electromagnetic shielding reducing the electromagnetic coupling between said coils to a value substantially less than the coupling therebetween through the magnetostrictive element when the diaphragm is in contact with said liquid, and means for determining the presence or absence of oscillations in said regenerative loop.

3. Liquid level sensing apparatus which comprises an ultrasonic transducer including a diaphragm mounted at one end thereof for contact with a liquid whose level is to be sensed, an elongated magnetostrictive element attached at one end to the diaphragm for producing oscillation thereof, said diaphragm and the structure attached thereto forming a mechanically resonant structure, separate transmitting and receiving coils encircling the magnetostrictive element in spaced relationship therealong, a permanent magnet encircling the magnetostrictive element for producing a substantial magnetic bias therein, said magnet being positioned between said coils to provide electromagnetic shielding therebetween, a metallic cylindrical member encircling the magnetostrictive element and attached at one end to the periphery of the diaphragm for substantially preventing axial movement thereof, said cylindrical member extending at least partially along the coil nearer the diaphragm to provide electromagnetic shielding between the coils, an amplifier having an output connected to the receiving coil and an output connected to the transmitting coil in regenerative relationship to form a regenerative loop including said magnetostrictive element, in which the regenerative frequency of oscillation is essentially determined by the mechanical resonant frequency of said mechanically resonant structure, the gain of the amplifier being predetermined to lie between the gains required to produce oscillation of said diaphragm when in contact with and out of contact with the liquid, said electromagnetic shielding reducing the electromagnetic coupling between said coils to a value substantially less than the coupling therebetween through the magnetostrictive element when the diaphragm is in contact with said liquid, and means for determining the presence or absence of oscillations in said regenerative loop.

4. Liquid level sensing apparatus in accordance with claim 3 in which the means for determining the presence or absence of oscillations comprises a detector connected to the output of said amplifier, and a relay responsive to the output of the detector.

References Cited by the Examiner
UNITED STATES PATENTS

| | | | |
|---|---|---|---|
| 2,154,260 | 4/39 | Brandenburger | 317—146 |
| 2,505,577 | 4/50 | Rich | 317—146 |
| 2,511,819 | 6/50 | Wannamaker | 317—146 |
| 2,990,482 | 6/61 | Kenny | 73—290 X |
| 3,017,771 | 1/62 | Bonhomme | 73—290 |

SAMUEL BERNSTEIN, *Primary Examiner.*

UNITED STATES PATENT OFFICE
CERTIFICATE OF CORRECTION

Patent No. 3,170,094                          February 16, 1965

Wilfred Roth

It is hereby certified that error appears in the above numbered patent requiring correction and that the said Letters Patent should read as corrected below.

Column 6, line 20, for "output" read -- input --.

Signed and sealed this 20th day of July 1965.

(SEAL)
Attest:

ERNEST W. SWIDER                        EDWARD J. BRENNER
Attesting Officer                          Commissioner of Patents